United States Patent [19]

Fiarman et al.

[11] Patent Number: 5,294,686

[45] Date of Patent: Mar. 15, 1994

[54] PROCESS FOR EFFICIENT UTILIZATION OF CHAIN TRANSFER AGENT

[75] Inventors: Irwin S. Fiarman, Willingboro, N.J.; Thomas F. McCallum, III, Philadelphia; Barry Weinstein, Dresher, both of Pa.

[73] Assignee: Rohm and Haas Company, Philadelphia, Pa.

[21] Appl. No.: 38,429

[22] Filed: Mar. 29, 1993

[51] Int. Cl.$^5$ .................. C08F 2/38; C08F 122/04
[52] U.S. Cl. ................................... 526/233; 526/271
[58] Field of Search .................... 526/233, 271

[56] References Cited

U.S. PATENT DOCUMENTS

| | | | |
|---|---|---|---|
| 4,774,303 | 9/1988 | Denzinger et al. | 526/233 |
| 5,077,361 | 12/1991 | Hughes et al. | 526/233 |
| 5,185,413 | 2/1993 | Yoshinaga et al. | 526/233 |

FOREIGN PATENT DOCUMENTS

| | | | |
|---|---|---|---|
| 0510831 | 10/1992 | European Pat. Off. | 526/233 |
| 1050063 | 2/1959 | Fed. Rep. of Germany | 526/233 |
| 59-136305 | 8/1984 | Japan | 526/233 |
| 2-34694 | 2/1990 | Japan | 526/233 |
| 34694 | 2/1990 | Japan . | |

*Primary Examiner*—Joseph L. Schofer
*Assistant Examiner*—N. Sarofin
*Attorney, Agent, or Firm*—David T. Banchik

[57] ABSTRACT

A process for efficiently utilizing hypophosphorous acid or salts thereof as a chain transfer agent is provided wherein the polymerization is conducted to a final polymer solids level of at least about 50 percent by weight.

The polymers produced are useful as dispersants for paint formulations, additives for laundry and machine dishwashing detergents, mineral dispersants, dispersants for kaolin clay slurries and scale inhibitors, dispersants and corrosion inhibitors for water treatment and oil production.

10 Claims, No Drawings

PROCESS FOR EFFICIENT UTILIZATION OF CHAIN TRANSFER AGENT

This invention relates to a process for efficient utilization of chain transfer agent. In particular, this invention relates to a process for the efficient use of hypophosphorous acid as a chain transfer agent in aqueous polymerizations.

Low molecular weight polycarboxylic acid polymers and their salts are useful as dispersants, scale inhibitors, detergent additives, sequestrants, etc. Generally a molecular weight below 50,000 is necessary for effective performance and often very low molecular weights below 10,000 are most effective. It is common to use chain transfer agents in the polymerization reaction to produce low, and especially the very low, molecular weight polymers. Hypophosphorus acid or its salts (commonly sodium hypophosphite) are a particularly desirable chain transfer agent, chosen primarily because they introduce phosphinate and phosphonate functionality into water soluble polymer molecules which confers superior performance properties in some applications. As used hereinafter and in the appended claims the term "hypophosphorous acid" is intended to include salts thereof, unless a clearly different meaning is indicated.

Inefficiency is a problem that is common to most of the known processes utilizing hypophosphorous acid as a chain transfer agent. Much of the agent does not specifically become part of the transfer process. A significant portion is not incorporated into the polymer and remains unreacted or is converted to other inorganic species like phosphorous acid or its salts. As a consequence, high levels of hypophosphorous acid are required to obtain low molecular weight. Since hypophosphorous acid is a relatively expensive material, it becomes a costly route to low molecular weight polymers if it is not used efficiently. In the case of preparing very low molecular weight polymers, the levels of hypophosphorous acid required may be prohibitively expensive if the hypophosphorous acid is not used efficiently.

A second disadvantage arising from the inefficiency is the significant amounts of unreacted hypophosphite or other inorganic residues present in the reaction product. These salts do not contribute to performance thereby diluting the activity of the reaction product. In some cases, such as preparing concentrated clay slurries, these salts can interfere with the dispersing process.

One method of increasing the efficiency of hypophosphorous acid as a chain transfer agent is disclosed in U.S. Pat. No. 5,077,361 to Hughes, et al. The method disclosed by Hughes, et al. requires the in-process neutralization of 20–100 percent equivalents of the carboxylic acid monomers. While this method does show a marked improvement in the efficiency of the hypophosphorous acid, it is inefficient in other ways. By requiring in-process neutralization, the process incurs the costs associated with the handling of the neutralizer and of the neutralizer itself. Further process challenges are presented in having to remove the heat of neutralization of the carboxylic acid monomers. Furthermore, the use of in-process neutralization produces salts of the carboxylic acid polymers.

The present invention seeks to overcome the problems associated with the prior art processes.

According to a first aspect of the present invention there is provided a process for utilizing hypophosphorous acid or salts thereof as a chain transfer agent, comprising:

polymerizing one or more monomers wherein at least 20 percent by weight of the one or more monomers are monoethylenically unsaturated acids, or salts thereof, in the presence of
(a) water
(b) one or more water-soluble initiators, and
(c) hypophosphorous acid or a salt thereof,
wherein from about 80 to 100 percent of the monoethylenically unsaturated acids, or salts thereof, are metered into a polymerization reactor containing water,
from 0 to 100 percent of the hypophosphorous acid or salts thereof to provide a final polymer solids level of at least about 50 percent by weight.

The chain transfer agent or chain regulator used in the process of the present invention is hypophosphorous acid or a salt thereof such as sodium hypophosphite monohydrate or ammonium hypophosphite. The chain transfer agent is preferably used at a level up to about 20 percent by weight based on the total monomer weight and most preferably at a level of from about 2 to about 10 percent by weight based on the total monomer weight.

It has been surprisingly found that when using hypophosphorous acid as the chain transfer agent, the final polymer solids level has a major effect on the chain transfer efficiency. The final polymer solids level is the amount, by weight, of polymer, relative to the amount, by weight, of the polymer and water, in the reactor at the end of the polymerization. By conducting the polymerization to a final solids level of at least about 50 percent by weight, the percentage of the hypophosphite that enters into the chain transfer process and become incorporated into the polymer, especially into dialkyl phosphinate polymer, molecules will significantly increase. Preferably, the polymerization is run to a final polymer solids level of from about 50 to about 70 percent by weight, and most preferably from about 52 to about 65 percent by weight. At final polymer solids levels above about 70 percent by weight, the viscosity of the polymer solution increases to the point where mixing becomes difficult. If the polymer solution is not mixed well, gel formation or other impurities may be observed. At final polymer solids levels below about 50 percent by weight, the efficiency of the chain transfer agent decreases. By conducting the polymerizations to final polymer solids levels of from about 50 to about 70 percent by weight, the relative amount of hypophosphorous acid chain transfer agent incorporated into the polymer is observed to be at least 80 percent, and preferably at least 90 percent.

The processes by which the polymers of the present invention are prepared are aqueous processes, substantially free of organic solvents. The water may be introduced into the polymerization reactor initially, as a separate feed, as the solvent for one or more of the other components of the reaction mixture or some combination thereof. The total amount of water is selected to provide a final polymer solids level preferably in the range of from about 50 percent to about 70 percent by weight.

The process of the present invention uses hypophosphorous acid as a chain transfer agent for the polymerizations of one or more monomers wherein at least 20 percent by weight of the one or more monomers are monoethylenically unsaturated acids. Monoethylenically unsaturated acids can be mono-acids, di-acids or polyacids and the acids may be carboxylic acids, sulphonic acids, phosphonic acids, salts or combinations thereof. Suitable monoethylenically unsaturated acids are, for example, acrylic acid, methacrylic acid, crotonic acid, vinylacetic acid, 2-acrylamido-2-methylpropanesulfonic acid and the alkali metal and ammonium salts thereof. Suitable monoethylenically unsaturated dicarboxylic acids and the anhydrides of the cis-dicarboxylic acids are, for example, maleic acid, maleic anhydride, 1,2,3,6-tetrahydrophthalic anhydride, 3,6-epoxy-1,2,3,6-tetrahydrophthalic anhydride, 5-norbornene-2,3-dicarboxylic anhydride, bicyclo[2.2.2]-5-octene-2,3-dicarboxylic anhydride, 3-methyl-1,2,6-tetrahydrophthalic anhydride, 2-methyl-1,3,6-tetrahydrophthalic anhydride, itaconic acid, mesaconic acid, fumaric acid, citraconic acid and the alkali metal and ammonium salts thereof. Other suitable monoethylenically unsaturated acids include, allylsulfonic acid, allylphosphonic acid, allyloxybenzenesulfonic acid, 2-hydroxy-3-(2-propenyloxy) propanesulfonic acid, isopropenylphosphonic acid, vinylphosphonic acid, styrenesulfonic acid, vinylsulfonic acid and the alkali metal and ammonium salts thereof. Most preferably, the one or more monoethylenically unsaturated acids are acrylic acid, methacrylic acid, or 2-acrylamido-2-methylpropanesulfonic acid. The one or more monoethylenically unsaturated acids represent at least about 20 percent by weight of the total monomer weight, preferably at least about 40 percent by weight of the total monomer weight.

It is preferred that the one or more monoethylenically unsaturated acids are used in their acid forms or partially neutralized form. If salts of the one or more monoethylenically unsaturated acids are used, they are preferably neutralized prior to the polymerization, rather than during the polymerization. If the one or more monoethylenically unsaturated acids are neutralized during the polymerization, the neutralizing solution may be fed separately, cofed, or fed with one or more of the other feeds. The neutralizing solution may be any inorganic or organic base. Among the preferred bases for partially neutralizing the one or more monoethylenically unsaturated acids are, for example, sodium hydroxide, potassium hydroxide, ammonium hydroxide, triethanolamine, dimethylamino ethanol, ethanolamine, and trimethylhydroxyethylammonium hydroxide.

In addition, the process of the present invention can be used to copolymerize one or more monoethylenically unsaturated acid-free monomers. Suitable monoethylenically unsaturated acid-free monomers include $C_1$–$C_4$ alkyl esters of acrylic or methacrylic acids such as methyl acrylate, ethyl acrylate, butyl acrylate, methyl methacrylate, ethyl methacrylate, butyl methacrylate and isobutyl methacrylate; hydroxyalkyl esters of acrylic or methacrylic acids such as hydroxyethyl acrylate, hydroxypropyl acrylate, hydroxyethyl methacrylate, and hydroxypropyl methacrylate. Other monoethylenically unsaturated acid-free monomers are acrylamides and alkyl-substituted acrylamides including acrylamide, methacrylamide, N-tertiarybutylacrylamide, N-methylacrylamide, and N,N-dimethylacrylamide. Other examples of monoethylenically unsaturated acid-free monomers include acrylonitrile, methacrylonitrile, allyl alcohol, phosphoethyl methacrylate, 2-vinylpyridine, 4-vinylpyridine, N-vinylpyrrolidone, N-vinylformamide, N-vinylimidazole, vinyl acetate, and styrene. If used, the one or more monoethylenically unsaturated acid-free monomers represent less than about 80 percent by weight of the total monomer weight, preferably less than about 60 percent by weight of the total monomer weight.

If desired, it is possible to incorporate polyethylenically unsaturated compounds into the polymerization process. Polyethylenically unsaturated compounds function as crosslinking agents and will result in the formation of higher molecular weight polymers.

Suitable initiators for the processes of the present invention are any conventional water-soluble initiators. One class of suitable initiators are thermal initiators such as hydrogen peroxide, certain alkyl hydroperoxides, dialkyl peroxides, persulfates, peresters, percarbonates, ketone peroxides and azo initiators. Specific examples of suitable free-radical initiators include hydrogen peroxide, t-butyl hydroperoxide, di-tertiary butyl peroxide, sodium persulfate, ammonium persulfate, potassium persulfate, tertiary-amyl hydroperoxide and methylethyl ketone peroxide. The free-radical initiators are preferably used in amounts of from about 1 percent to about 20 percent based on the total monomer weight, and most preferably from about 2 to about 10 percent by weight based on the total monomer weight.

Water-soluble redox initiators may also be used. These initiators include, but are not limited to, sodium bisulfite, sodium sulfite, persulfates, hypophosphites, isoascorbic acid, sodium formaldehyde-sulfoxylate and the like, used with suitable oxidizing agents, such as the thermal initiators noted above. The redox initiators are typically used in amounts of from about 0.05 percent to about 10 percent, based on the weight of total monomer. A preferred range is from about 0.5 to about 5 percent by weight of total monomer. Combinations of initiators can also be used.

Preferably, one or more water-soluble metal salts are used to promote polymerization and to control the molecular weight during the polymerization. Water-soluble metal salts such as the salts of copper, iron, cobalt and manganese, are preferably used at levels of from about 1 to 200 parts per million (ppm) of the metal ion, based on the total monomer weight, and more preferably from about 5 to 100 ppm. The preferred metal salts are the copper salts and iron salts, which include all inorganic and organic compounds that will generate copper or iron ions in aqueous solution. Suitable salts include sulfates, nitrates, chlorides, and acetates and glutonates.

The process of the present invention can be conducted as a cofeed or heel process, and is preferably or a combination thereof. Furthermore, the process can be done in a batch or continuous manner. A heel process is one where all of one or more of the reactants are present in the polymerization reactor, and the remaining reactants are metered, or fed, into the reactor over a period of time. A cofeed process is one where all of the reactants are metered, or fed, into the reactor over a period of time. A combination of a heel and a cofeed process is one where a portion of one or more of the reactants are present in the polymerization reactor, and the remainder of the one or more reactants are metered, or fed, into the reactor over a period of time. In a continuous mode, continuous removal of a portion of the reactor contents would be started after a portion of the reactants had been added; after approximately 30 minutes for example. The rate of the addition of the remaining reactants would then be continued at a rate equal to the discharge rate.

Preferably, the process of the present invention is conducted as a combination of a heel and a cofeed process wherein a portion of the chain transfer agent is present in the polymerization reactor and the remainder of the chain transfer agent and the other reactants are metered into the reactor. Preferably, from about 20 to about 80 percent of the total amount of chain transfer agent is present in the reactor and the remainder of the chain transfer agent and the other reactants are metered into the reactor. Similarly, the other components used in the polymerization process, including optional components, such as metals, can be present in the reactor or metered into the reactor or a combination thereof. Preferably, from about 80 to 100 percent of the monoethylenically unsaturated acids, or salts thereof. Most preferably, substantially all of the one or more monoethylenically unsaturated acids or salts thereof and the one or more water-soluble initiators are fed into the reactor. The components which are fed into the reactor may be fed as separate streams or combined with one or more of the other feed streams. It is preferred that the initiator and the one or more monomers be fed as separate streams.

The streams are preferably fed linearly, in other words, at constant rates, into the reactor. The feeds are generally conducted over a period of time preferably ranging from about 5 minutes to about 5 hours, more preferably from 30 minutes to 4 hours, and most preferably from 1 hour to 3 hours. If desired, the streams can be staggered so that one or more of the streams are started and/or completed before the others. Preferably, the chain transfer agent stream is started at the same time or before the one or more monomer streams, and preferably the chain transfer agent stream is completed at the same time or before the one or more monomer streams are completed.

The temperature of the polymerization reaction will depend on the choice of initiator, and target molecular weight. Generally, the temperature of the polymerization is up to the boiling point of the system although the polymerization can be conducted under pressure if higher temperatures are used. Preferably, the temperature of the polymerization is from about 45° to about 110° C. and most preferably from about 60° to about 105° C.

Compositions with high levels of polymeric phosphorus and low inorganic levels of inorganic phosphorus compounds are more useful in a number of end use applications including dispersants for paint formulations, additives for laundry and machine dishwashing detergents, mineral dispersants, dispersants for kaolin clay slurries and scale inhibitors, dispersants and corrosion inhibitors for water treatment and oil production. The fate of the hypophosphorous acid in the polymerization process is as a mixture of species. NMR analysis indicates the compositions include:

A - Polymeric
(1) Dialkyl phosphinate

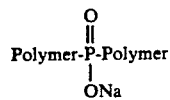

(2) Monoalkyl phosphinate

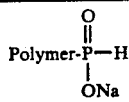

(3) Monoalkyl phosphonate

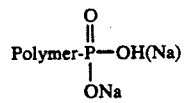

B - Inorganic (Unincorporated)
(4) Sodium hypophosphite

(5) phosphorus Acid (or salt)

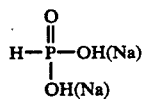

The ratio of these species present in the polymer product is a function of the process employed. As illustrated by the examples, the polymerization processes conducted to a final polymer solids level of at least 50 percent results in more efficient use of the hypophosphorous acid as a chain transfer agent; in other words the process results in less unincorporated inorganic compounds and more polymer species, without having to resort to other, more costly approaches.

The control of molecular weight and the narrow polydispersity of a polymer product is also an indication of the efficient utilization of a chain transfer agent. The process of the present invention results in low molecular weight water soluble polymers containing phosphinate or phosphonate moieties incorporated into the polymer chain. Low molecular weight refers to a weight average molecular weight ($M_w$) less than 20,000 and preferably less than 10,000. In addition, the process of the present invention results in polymers having a narrow polydispersity. The polydispersity (D) is the ratio of the weight average molecular weight ($M_w$) to the number average molecular weight ($M_n$). The molecular weights referred to are those measured by aqueous gel permeation chromatography (GPC) relative to a poly(acrylic acid) standard having $M_w$ of 4,500.

The following specific examples are intended to illustrate various embodiments of the invention but are not intended to otherwise limit the scope of the broader aspects of the invention.

EXAMPLE 1

To a 5-gallon reactor equipped with a mechanical stirrer, a condenser, a thermometer and inlets for the gradual additions of monomer, initiator and sodium hypophosphite solutions, was added 6450 grams of deionized water and 107.5 grams of a 0.15 weight percent aqueous $FeSO_4 \cdot 7H_2O$ solution. The contents of the flask were heated to 90° C., and a solution of 322.5 grams of sodium hypophosphite monohydrate dissolved in 600 grams of deionized water was added. A monomer charge of 10,750 grams of glacial acrylic acid was prepared. A chain regulator solution was prepared by dissolving 322.5 grams of sodium hypophosphite monohydrate in 600.0 grams of deionized water. An initiator solution was prepared by dissolving 107.5 grams of sodium persulfate in 600.0 grams of deionized water. The additions of separate feeds of the monomer charge, the chain regulator solution, and the initiator solution into the heated stirring flask were begun simultaneously and were continued linearly and separately for 120 minutes, 95 minutes, and 120 minutes respectively, while maintaining the contents of the flask at 90°-92° C. After the feeds were completed, the contents of the flask were maintained at 90°-92° C. for 30 minutes. The data appear in Table I, below.

EXAMPLE 2

To a 1-liter four neck flask equipped with a mechanical stirrer, a condenser, a thermometer and inlets for the gradual additions of monomer and initiator, was added 180 grams of deionized water and 3.0 grams of a 0.15 weight percent aqueous $FeSO_4.7H_2O$ solution. The contents of the flask were heated to 90° C. and a solution of 22.20 grams of sodium hypophosphite monohydrate dissolved in 40.0 grams of deionized water was added. A monomer charge of 300 grams of glacial acrylic acid was prepared. An initiator solution was prepared by dissolving 3.0 grams of sodium persulfate in 10.0 grams of deionized water. The additions of separate feeds of the monomer charge and the initiator solution into the heated stirring flask were begun simultaneously and were each continued linearly and separately for 120 minutes while maintaining the contents of the flask at 90°-92° C. After the feeds were completed, the contents of the flask were maintained at 90°-92° C. for 30 minutes. The data appear in Table I, below.

EXAMPLE 3

To a 2-liter four neck flask equipped with a mechanical stirrer, a condenser, a thermometer and inlets for the gradual additions of monomer, initiator, sodium hypophosphate and neutralizer solutions, was added 70 grams of deionized water. The contents of the flask were heated to 90° C. A monomer charge of 600 grams of glacial acrylic acid was prepared. A chain regulator solution was prepared by dissolving 33.4 grams of sodium hypophosphite monohydrate in 43.0 grams of deionized water and adding 6.0 grams of a 0.15 weight percent aqueous $FeSO_4.7H_2O$ solution. An initiator solution was prepared by dissolving 6.0 grams of sodium persulfate in 20.0 grams of deionized water. A neutralizer cofeed of 636.0 grams of 50 percent by weight aqueous sodium hydroxide was prepared. The additions of separate feeds of the monomer charge, the neutralizer cofeed, and the initiator solution into the heated stirring flask were begun simultaneously and were continued linearly and separately for 120 minutes, while maintaining the contents of the flask at 90°-92° C. Five minutes after those feeds were begun, the chain regulator solution was fed into the reactor linearly and separately for 115 minutes. After the feeds were completed, the contents of the flask were maintained at 90°-92° C. for 30 minutes. The data appear in Table I, below.

EXAMPLE 4

To a 500-milliliter four neck flask equipped with a mechanical stirrer, a condenser, a thermometer and inlets for the gradual additions of monomer, initiator and sodium hypophosphite solutions, was added 140 grams of deionized water. The contents of the flask were heated to 90° C. and a solution of 3.50 grams of sodium hypophosphite monohydrate dissolved in 10.0 grams of deionized water was added. A monomer charge of 180 grams of glacial acrylic acid was prepared and a second monomer charge of 20.0 grams of 2-vinylpyridine was prepared. A chain regulator solution was prepared by dissolving 3.5 grams of sodium hypophosphite monohydrate in 28.4 grams of deionized water. An initiator solution was prepared by dissolving 2.0 grams of sodium persulfate in 10.0 grams of deionized water. The additions of separate feeds of the monomer charge, the second monomer charge, the chain regulator solution, and the initiator solution into the heated stirring flask were begun simultaneously and were continued linearly and separately for 120 minutes, 95 minutes, 120 minutes, and 120 minutes respectively, while maintaining the contents of the flask at 90°-92° C. After the feeds were completed, the contents of the flask were maintained at 90°-92° C. for 30 minutes. The data appear in Table I, below.

EXAMPLE 5

To a 1-liter four neck flask equipped with a mechanical stirrer, a condenser, a thermometer and inlets for the gradual additions of monomer, initiator and sodium hypophosphite solutions, was added 110 grams of deionized water and 3.0 grams of a 0.15 weight percent aqueous $FeSO_4.7H_2O$ solution. The contents of the flask were heated to 90° C. A monomer charge of 160 grams of glacial acrylic acid and 88.5 grams of a 50 aqueous sodium 2-acrylamido-2-methyl propane sulfonate solution was prepared. A chain regulator solution was prepared by dissolving 9.4 grams of sodium hypophosphite monohydrate in 20.0 grams of deionized water. An initiator solution was prepared by dissolving 2.0 grams of sodium persulfate in 10.0 grams of deionized water. The additions of separate feeds of the monomer charge, the chain regulator solution, and the initiator solution into the heated stirring flask were begun simultaneously and were continued linearly and separately for 120 minutes, 90 minutes, and 120 minutes respectively, while maintaining the contents of the flask at 90°-92° C. After the feeds were completed, the contents of the flask were maintained at 90°-92° C. for 30 minutes. The data appear in Table I, below.

COMPARATIVE EXAMPLE 1

To a 1-liter four neck flask equipped with a mechanical stirrer, a condenser, a thermometer and inlets for the gradual additions of monomer, initiator and sodium hypophosphite solutions, was added 364 grams of deionized water and 3.0 grams of a 0.15 weight percent aqueous $FeSO_4.7H_2O$ solution. The contents of the flask were heated to 90° C., and a solution of 9.00 grams of sodium hypophosphite monohydrate dissolved in 20.0 grams of deionized water was added. A monomer charge of 500 grams of glacial acrylic acid was prepared. A chain regulator solution was prepared by dissolving 9.0 grams of sodium hypophosphite monohydrate in 20.0 grams of deionized water. An initiator solution was prepared by dissolving 3.0 grams of sodium persulfate in 10.0 grams of deionized water. The additions of separate feeds of the monomer charge, the chain regulator solution, and the initiator solution into the heated stirring flask were begun simultaneously and were continued linearly and separately for 120 minutes, 95 minutes, and 120 minutes respectively, while maintaining the contents of the flask at 90°-92° C. After the feeds were completed, the contents of the flask were maintained at 90°-92° C. for 30 minutes. The data appear in Table I, below.

COMPARATIVE EXAMPLE 2

To a 2-liter four neck flask equipped with a mechanical stirrer, a condenser, a thermometer and inlets for the gradual additions of monomer, initiator and sodium hypophosphite solutions, was added 566 grams of deionized water. The water was heated to 90° C. A monomer charge of 500 grams of glacial acrylic acid was prepared. A chain regulator co-feed solution was prepared by dissolving 36.8 grams of sodium hypophosphite monohydrate in 40 grams of deionized water. An initiator solution was prepared by dissolving 5 grams of sodium persulfate in 58 grams of deionized water.

The acrylic acid, sodium persulfate and sodium hypophosphite charges were added linearly and separately over three hours to the stirring water charge. Temperature was maintained at 90(+/−)2° C. When the polymerization was completed, 528 grams of 50% sodium hydroxide solution was added to neutralize the polymer solution.

The polymerization was conducted to a final polymer solids level of about 45 percent; the resultant polymer solution after the addition of the sodium hydroxide solution had a solids content of 42%, pH 6.5, residual monomer of less than 0.01%, and $M_w$=4320.

NMR analysis shows the composition was a mixture of the same species as in Example 1 but with a different ratio. Of the total phosphorus present, 45% was incorporated into dialkyl phosphinate polymer, 25% in monoalkyl phosphinate and phosphonate polymer and 30% not incorporated in the polymer.

COMPARATIVE EXAMPLE 3

The procedure of Comparative Example 1 was repeated except that the sodium hypophosphite monohydrate charge was increased to 73.6 grams dissolved in 80 grams of deionized water.

The resultant polymer solution had 41% solids, pH 6.5, residual monomer <0.01% and $M_w$=2300.

NMR analysis showed that the percent of phosphorus in the product was about 40% in dialkyl phosphonate polymer, about 25% in monoalkyl phosphinate and phosphonate polymer and about 35% not incorporated in polymer.

COMPARATIVE EXAMPLE 4

To a 1-liter four neck flask equipped with a mechanical stirrer, a condenser topped with nitrogen inlet, a thermometer and inlets for the gradual additions of monomer, initiator and sodium hypophosphite solutions, was added 250 grams of deionized water and 10.0 grams of a 0.15 weight percent aqueous $FeSO_4 \cdot 7H_2O$ solution. The contents of the flask were heated to 90° C. and a nitrogen sweep was begun. A monomer charge of 250 grams of glacial acrylic acid was prepared. A chain regulator solution was prepared by dissolving 18.4 grams of sodium hypophosphite monohydrate in 70.0 grams of deionized water. An initiator solution was prepared by dissolving 2.50 grams of sodium persulfate in 50.0 grams of deionized water. The additions of separate feeds of the monomer charge, the chain regulator solution, and the initiator solution into the heated stirring flask were begun simultaneously and were each continued linearly and separately for 120 minutes while maintaining the contents of the flask at 90°–92° C. After the feeds were completed, the contents of the flask were maintained at 90°–92° C. for 30 minutes. The data appear in Table I, below.

The data appearing in Table I, below, are the final polymer "solids" reported as percent by weight; the level of chain transfer agent, "CTA," reported as percent by weight based on the total monomer weight; the "ratio" of the relative amount of chain transfer agent in the heel to the relative amount of chain transfer agent cofed; the "efficiency" reported as the percent of the chain transfer agent incorporated into polymeric species as indicated by NMR; Mw; Mn; and data points not measured are reported as "n.m."

TABLE I

| Example | Solids | NaHP | Heel:Cofeed | Efficiency | Mw | Mn |
|---|---|---|---|---|---|---|
| 1 | 59.4 | 6.0 | 50:50 | 97 | 3680 | 3120 |
| 2 | 58.6 | 7.4 | 100:0 | 98 | 3540 | 2710 |
| 3 | 58.0 | 6.1 | 1:10 | 98 | 2950 | 2550 |
| 4 | 51.0 | 3.5 | 50:50 | n.m. | 5720 | 4590 |
| 5 | 55.5 | 4.7 | 0:100 | n.m. | 4590 | 3670 |
| Comp. 1 | 43.1 | 6.0 | 50:50 | 91 | 3650 | 3020 |
| Comp 2 | 45 | 7.4 | 0:100 | 70 | 4320 | n.m. |
| Comp 3 | 45 | 14.7 | 0:100 | 65 | 2300 | n.m. |
| Comp. 4 | 41.5 | 7.4 | 0:100 | 64 | 3540 | 2710 |

EXAMPLE 6

To a 2-liter four neck flask equipped with a mechanical stirrer, a condenser, a thermometer and inlets for the gradual additions of monomer, initiator and sodium hypophosphite solutions, was added 366.7 grams of deionized water and 9.1 grams of a 0.15 weight percent aqueous $FeSO_4 \cdot 7H_2O$ solution. The contents of the flask were heated to 90° C. and a solution of 27.6 grams of sodium hypophosphite monohydrate dissolved in 69.25 grams of deionized water was added. A monomer charge of 921.2 grams of glacial acrylic acid was prepared. A chain regulator solution was prepared by dissolving 27.6 grams of sodium hypophosphite monohydrate in 69.25 grams of deionized water. An initiator solution was prepared by dissolving 9.21 grams of sodium persulfate in 70.7 grams of deionized water. The additions of separate feeds of the monomer charge, the chain regulator solution, and the initiator solution into the heated stirring flask were begun simultaneously and were continued linearly and separately for 180 minutes while maintaining the contents of the flask at 90°(+/−)1° C. After the feeds were completed, the contents of the flask were maintained at 90°(+/−)1° C. 30 minutes. 94.0 percent of the phosphorous was incorporated into the polymer. The data appear in Table II, below.

EXAMPLE 7

The procedure of Example 6 was followed except that the feeds were continued linearly and separately for 60 minutes. 91.5 percent of the phosphorous was incorporated into the polymer. The data appear in Table II below.

EXAMPLE 8

The procedure of Example 6 was followed except that the feeds were continued linearly and separately for 120 minutes. 94.0 percent of the phosphorous was incorporated into the polymer. The data appear in Table II below.

EXAMPLE 9

To a 2-liter four neck flask equipped with a mechanical stirrer, a condenser, a thermometer and inlets for the gradual additions of monomer, initiator and sodium hypophosphite solutions, was added 418.6 grams of deionized water and 9.1 grams of a 0.15 weight percent aqueous $FeSO_4.7H_2O$ solution. The contents of the flask were heated to 90° C. and a solution of 13.8 grams of sodium hypophosphite monohydrate dissolved in 17.3 grams of deionized water was added. A monomer charge of 921.2 grams of glacial acrylic acid was prepared. A chain regulator solution was prepared by dissolving 41.4 grams of sodium hypophosphite monohydrate in 69.25 grams of deionized water. An initiator solution was prepared by dissolving 9.21 grams of sodium persulfate in 69.25 grams of deionized water. The additions of separate feeds of the monomer charge, the chain regulator solution, and the initiator solution into the heated stirring flask were begun simultaneously and were continued linearly and separately for 120 minutes while maintaining the contents of the flask at 90°(+/−)1° C. After the feeds were completed, the contents of the flask were maintained at 90°(+/−)1° C. for 30 minutes. The data appear in Table II, below.

EXAMPLE 10

To a 2-liter four neck flask equipped with a mechanical stirrer, a condenser, a thermometer and inlets for the gradual additions of monomer, initiator and sodium hypophosphite solutions, was added 418.6 grams of deionized water and 9.1 grams of a 0.15 weight percent aqueous $FeSO_4.7H_2O$ solution. The contents of the flask were heated to 90° C. and a solution of 9.2 grams of sodium hypophosphite monohydrate dissolved in 17.3 grams of deionized water was added. A monomer charge of 921.2 grams of glacial acrylic acid was prepared. A chain regulator solution was prepared by dissolving 27.64 grams of sodium hypophosphite monohydrate in 70.7 grams of deionized water. An initiator solution was prepared by dissolving 9.21 grams of sodium persulfate in 69.25 grams of deionized water. The additions of separate feeds of the monomer charge, the chain regulator solution, and the initiator solution into the heated stirring flask were begun simultaneously and were continued linearly and separately for 120 minutes while maintaining the contents of the flask at 90(+/−)1° C. After the feeds were completed, the contents of the flask were maintained at 90(+/−)1° C. for 30 minutes. The data appear in Table II, below.

EXAMPLE 11

To a 2-liter four neck flask equipped with a mechanical stirrer, a condenser, a thermometer and inlets for the gradual additions of monomer, initiator and sodium hypophosphite solutions, was added 418.6 grams of deionized water and 9.1 grams of a 0.15 weight percent aqueous $FeSO_4.7H_2O$ solution. The contents of the flask were heated to 90° C. and a solution of 17.0 grams of sodium hypophosphite monohydrate dissolved in 17.3 grams of deionized water was added. A monomer charge of 921.2 grams of glacial acrylic acid was prepared. A chain regulator solution was prepared by dissolving 51.1 grams of sodium hypophosphite monohydrate in 70.7 grams of deionized water. An initiator solution was prepared by dissolving 9.2 grams of sodium persulfate in 69.25 grams of deionized water. The additions of separate feeds of the monomer charge, the chain regulator solution, and the initiator solution into the heated stirring flask were begun simultaneously and were continued linearly and separately for 120 minutes while maintaining the contents of the flask at 90(+/−)1° C. After the feeds were completed, the contents of the flask were maintained at 90(+/−)1° C. for 30 minutes. The data appear in Table II, below.

EXAMPLE 12

The procedure of Example 8 was followed except that the contents of the flask were maintained at 95(+/−)1° C. The data appear in Table II below.

EXAMPLE 13

The procedure of Example 8 was followed except that the chain regulator solution was fed linearly and separately for 30 minutes. The data appear in Table II below.

EXAMPLE 14

The procedure of Example 8 was followed except that the chain regulator solution was fed linearly and separately for 60 minutes. The data appear in Table II below.

EXAMPLE 15

The procedure of Example 8 was followed except that the chain regulator solution was fed linearly and separately for 100 minutes. The data appear in Table II below.

The examples appearing in Table II, below, were all conducted to a final polymer solids level of 54 percent by weight. The level of chain transfer agent, "CTA," is reported as the percent by weight based on the total monomer weight; the "heel" is reported as the relative amount of chain transfer agent in the heel; the "cofeed" is reported as the relative amount of chain transfer agent cofed; the "temp" reported is the polymerization temperature in °C.; the "time" reported is the feed time of the chain transfer agent in minutes; and $M_w$ is reported.

TABLE II

| Example | CTA | HEEL | COFEED | TEMP | TIME | Mw |
|---|---|---|---|---|---|---|
| 6 | 6 | 50 | 50 | 89–91 | 180 | 3729 |
| 7 | 6 | 50 | 50 | 89–91 | 60 | 3680 |
| 8 | 6 | 50 | 50 | 89–91 | 120 | 3500 |
| 9 | 6 | 25 | 75 | 89–91 | 120 | 3520 |
| 10 | 4 | 25 | 75 | 89–91 | 120 | 4515 |
| 11 | 7.4 | 25 | 75 | 89–91 | 120 | 2985 |
| 12 | 6 | 25 | 75 | 94–96 | 120 | 3415 |
| 13 | 6 | 25 | 75 | 89–91 | 30 | 4610 |
| 14 | 6 | 25 | 75 | 89–91 | 60 | 3775 |
| 15 | 6 | 25 | 75 | 89–91 | 100 | 3415 |

We claim:
1. A process for utilizing hypophosphorous acid or salts thereof as a chain transfer agent, comprising:
  polymerizing one or more monomers wherein at least 20 percent by weight of the one or more monomers are monoethylenically unsaturated acids, or salts thereof, in the presence of
  (a) water
  (b) one or more water-soluble initiators, and
  (c) hypophosphorous acid or a salt thereof,
  wherein from about 80 to 100 percent of the monoethylenically unsaturated acids, or salts thereof, are metered into a polymerization reactor containing water,
  from 0 to 100 percent of the hypophosphorous acid or salts thereof to provide a final polymer solids level of at least about 50 percent by weight.

2. The process of claim 1, wherein: the final polymer solids level is from about 52 to about 65 percent by weight.

3. The process of claim 1, wherein: the monoethylenically unsaturated acids, or salts thereof, are metered into a polymerization reactor containing
   water, and
   from about 20 to about 80 percent of the hypophosphorous acid or salts thereof.

4. The process of claim 1, wherein: substantially all of the one or more monoethylenically unsaturated acids or salts thereof are metered into the reactor.

5. The process of claim 1, wherein: about 80 to 100 percent of the monoethylenically unsaturated acids, or salts thereof, are metered into a polymerization reactor over a period of from about 5 minutes to about 5 hours.

6. The process of claim 1, wherein: about 80 to 100 percent of the monoethylenically unsaturated acids, or salts thereof, are metered into a polymerization reactor over a period of from about 1 hour to about 3 hours.

7. The process of claim 1, wherein the one or more monomers are acrylic acid, methacrylic acid, 2-acrylamido-2-methylpropanesulfonic acid or salts thereof.

8. The process of claim 1, wherein the one or more monoethylenically unsaturated acids are selected from the group consisting of acrylic acid, methacrylic acid, crotonic acid, vinylacetic acid, maleic acid, maleic anhydride,1,2,3,6-tetrahydrophthalic anhydride, 3,6-epoxy-1,2,3,6-tetrahydrophthalic anhydride, 5-norbornene-2,3-dicarboxylic anhydride, bicyclo[2.2.2]-5-octene-2,3-dicarboxylic anhydride, 3-methyl-1,2,6-tetrahydrophthalic anhydride, 2-methyl-1,3,6-tetrahydrophthalic anhydride, itaconic acid, mesaconic acid, fumaric acid, citraconic acid, 2-acrylamido-2-methylpropanesulfonic acid, allylsulfonic acid, allylphosphonic acid, allyloxybenzenesulfonic acid, 2-hydroxy-3-(2-propenyloxy) propanesulfonic acid, isopropenylphosphonic acid, vinylphosphonic acid, styrenesulfonic acid, vinylsulfonic acid and the alkali metal and ammonium salts thereof.

9. The process of claim 1 wherein up to about 80 percent by weight of the one or more monomers are monoethylenically unsaturated acid-free monomers.

10. The process of claim 1 wherein the monoethylenically unsaturated acid-free monomers are selected from the group consisting of acrylamide, methacrylamide, N-tertiarybutylacrylamide, N-methylacrylamide, N,N-dimethylacrylamide, methyl acrylate, ethyl acrylate, butyl acrylate, methyl methacrylate, butyl methacrylate, isobutyl methacrylate, hydroxyethyl acrylate, hydroxypropyl acrylate, hydroxyethyl methacrylate, acrylonitrile, methacrylonitrile, allyl alcohol, phosphoethyl methacrylate, 2-vinylpyridene, 4-vinylpyridene, N-vinylpyrrolidone, N-vinylformamide, N-vinylimidazole, vinyl acetate, and styrene.

* * * * *